(12) United States Patent
Nakai et al.

(10) Patent No.: US 6,300,587 B1
(45) Date of Patent: Oct. 9, 2001

(54) WIRE ELECTRODE FOR ELECTRO-DISCHARGE MACHINING AND MANUFACTURING METHOD THEREOF

(75) Inventors: Yoshihiro Nakai; Kouichi Yamada; Kenji Miyazaki; Shinji Inazawa; Shigeo Ezaki; Toshihiro Kume, all of Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/604,915

(22) Filed: Jun. 28, 2000

Related U.S. Application Data

(62) Division of application No. 08/996,144, filed on Dec. 22, 1997.

(30) Foreign Application Priority Data

Dec. 26, 1996 (JP) ..................................... 8-347008
Jul. 18, 1997 (JP) ..................................... 9-193586

(51) Int. Cl.[7] ................................................. B23H 1/00
(52) U.S. Cl. .................................. 219/69.12; 219/69.11; 219/69.15
(58) Field of Search ........................ 219/69.12, 69.11, 219/69.15; 148/240, 277

(56) References Cited

U.S. PATENT DOCUMENTS

| 4,341,939 | * | 7/1982 | Briffod et al. .......................... 219/69 |
| 4,686,153 | | 8/1987 | Tominaga et al. . |
| 4,717,804 | * | 1/1988 | Tomalin .................. 219/69 |
| 4,924,050 | | 5/1990 | Hermanni . |
| 4,935,594 | * | 6/1990 | Groos et al. ...................... 219/69.12 |
| 4,977,303 | * | 12/1990 | Briffod et al. .................... 219/69.12 |
| 4,988,552 | * | 1/1991 | Tomalin ............................. 428/677 |

FOREIGN PATENT DOCUMENTS

| 0 526 361 | 2/1993 | (EP) . |
| 0 734 805 | 10/1996 | (EP) . |
| 61-3615 | 2/1986 | (JP) . |
| 63-018072 | 1/1988 | (JP) . |
| 1-127228 | 5/1989 | (JP) . |
| 3-138341 | 6/1991 | (JP) . |

* cited by examiner

Primary Examiner—M. Alexandra Elve
(74) Attorney, Agent, or Firm—McDermott, Will & Emery

(57) ABSTRACT

A wire electrode for wire electro-discharge machining comprises a core, and a coating layer formed on an outer periphery of the core at least a surface layer of which contains copper. The coating layer comprises an alloy of copper and at least one element selected from the group consisting of Zn, Cs, Se, Te and Mg, with the copper content being about 55.5 wt % to about 75 wt %. The coating layer does not have an oxide film thereon other than a natural oxide film.

8 Claims, 1 Drawing Sheet

WIRE ELECTRODE FOR ELECTRO-DISCHARGE MACHINING AND MANUFACTURING METHOD THEREOF

This application is a Divisional of application Ser. No. 08/996,144 filed Dec. 22, 1997.

BACKGROUND OF THE INVENTION

1. Field of the Invention

The present invention relates to a wire electrode which is employed for wire electro-discharge machining, and to a method of manufacturing method thereof.

2. Description of the Background Art

Wire electro-discharge machining is a method of causing intermittent discharge between a linear working electrode called a wire electrode for electro-discharge machining and a workpiece through a working fluid such as water or oil. The workpiece is moved relative to the wire electrode for electro-discharge machining, thereby melting and cutting the workpiece into a desired configuration. This method is utilized for manufacturing various types of metal molds and the like. In such wire electro-discharge machining, required are processing characteristics such as excellent finishing, high working accuracy, good finished surface state of the workpiece, no adhesion of the wire electrode material to the workpiece, and a short electro-discharge machining time. A wire electrode employed for such wire electro-discharge machining is generally prepared from a brass wire, which has good drawability and high strength required for a wire electrode.

As working power sources have been improved/advanced, it is desirable to provide a wire electrode which can improve processing speed. A wire electrode for improved processing speed is particularly desired for applications employing a power source of a wire electro-discharge machining which repeatedly applies a high and short-time pulse voltage.

However, wire electrodes for electro-discharge machining typically prepared from a brass wire are incapable of attaining a sufficiently high processing speed. Further, brass wires are problematic in that electrode material adheres to the workpiece. As a result, the cut surface of the workpiece is roughened and the wire electrode is easily broken when electro-discharge machining is performed at a high processing speed.

A wire electrode for wire electro-discharge machining prepared by covering a core formed of Cu (copper) or a Cu alloy with Zn (zinc), or prepared by covering the core with Zn, heat treating to generate a Cu—Zn alloy at a surface layer by diffusion and having an oxide film on the outermost surface has been used in some applications. The Zn coated Cu or Cu alloy wire electrode results in improved cut surface of the workpiece; however, it cannot provide a sufficiently high processing speed. The diffusion alloy coated wire electrode improves to some extent the processing speed; however, the property of the cut surface of the workpiece is not sufficiently improved and it is difficult to position the wire electrode before starting electro-discharge machining. As compared with the brass wire, the conventional wire electrode for wire electro-discharge machining having a core and a coating layer formed on an outer periphery of the core has improved electro-discharge machining characteristics. However, the wire electrode itself, a wire contact (a roller or die for feeding electricity), a guide die and the like suffer wear and undergo considerable damage, thereby shortening their lifetime and significantly increasing the cost of electro-discharge machining.

DETAILED DESCRIPTION OF THE INVENTION

An object of the present invention is to provide a wire electrode for wire electro-discharge machining which allows reduction in electro-discharging machining time, suppresses adhesion of electrode material to the workpiece and provides a smoothly cut workpiece surface, at a low cost. Another object of the present invention is to provide a wire electrode for wire electro-discharge machining which allows easy positioning, does not reduce the lifetime of the wire contact and the guide die and, hence, generally reduces the cost of electro-discharge machining.

After extensive investigation and experimentation, it was found that the formation of a thick coating layer at extremely high speed by exposing the core to a prescribed vapor to cause reaction between copper contained in the surface layer of the core with an element of the vapor, provides a wire electrode for wire electro-discharge machining having superior electro-discharge machining characteristics (high processing speed, no adhesion at the cut surface of the workpiece and a smoothly cut surface).

In the method of manufacturing a wire electrode for wire electro-discharge machining according to one aspect of the present invention, a core, at least a surface layer of which contains copper, is exposed to a vapor containing at least one element selected from the group consisting of Zn, Cs (cesium), Se (selenium), Te (tellurium) and Mg (magnesium), which element of the vapor reacts with copper contained in the surface layer of the core, thereby forming a coating layer on the outer periphery of the core.

In the inventive manufacturing method, the core is only exposed to the vapor and, therefore, the manufacturing process is simplified as compared with conventional methods including electroplating followed by diffusion. Accordingly, the manufacturing cost is reduced and inexpensive wire electrodes for wire electro-discharge machining are provided.

According to the inventive method of manufacturing, the core can be exposed several times to the same or different vapor without encountering any problem as in conventional methodology. A wire electrode for wire electro-discharge machining prepared through diffusion unavoidably suffers from the problem of oxidation or tarnishing of the surface. However, in the inventive manufacturing method utilizing vapor, the surface is neither oxidized nor tarnished, and the electrode wire has a smooth and satisfactory surface.

In the inventive method of manufacturing utilizing vapor, it is preferred that after formation of the coating layer, the wire is subjected to plastic working to effect an area reduction rate (reduction rate in the cross sectional area) of about 40% to about 99%. Plastic deformation includes drawing, roll working or the like, for example. When the area reduction rate of plastic working is smaller than 40%, sufficient strength of the wire electrode is not ensured. When the area reduction rate exceeds 99%, strength at high temperature is lost, resulting in frequent breaking of the wire electrode during electro-discharge machining. The area reduction rate is defined by the following equation:

Area reduction rate (%)=$\{(d_1^2 - d_2^2)/d_1^2\} \times 100$; wherein
   $d_1$: is the wire diameter before processing; and
   $d_2$: is the wire diameter after processing.

It was found that the electro-discharge machining characteristics can be further improved when the coating layer is formed with a copper content of about 50.5 wt % to about 75 wt %. When the copper content is less than about 50.5 wt %, the processing speed is not satisfactory; and when copper content exceeds about 75 wt %, the processing speed, reduction of adhesion of electrode material to the cut surface and surface properties are not satisfactory. Further, when the copper content in the coating layer is smaller than about 50.5 wt %, plastic working, such as drawing, is difficult, thereby increasing cost.

In a preferred embodiment of the inventive method, the coating layer is formed by exposing the core to the vapor at a temperature of about 300° C. to about 1050° C. When the temperature is lower than about 300° C., it becomes necessary to expose the core to the vapor for a long period of time to form the coating layer, which leads to increased cost; and when the temperature exceeds about 1050° C., the surface properties of the wire electrode are deteriorated, thereby adversely affecting electro-discharge machining characteristics.

Preferably, the inventive wire electrode for wire electro-discharge machining is formed by rapid cooling after forming the coating layer by vapor exposure. Rapid cooling provides surface hardening of the wire electrode, thereby improving electro-discharge machining characteristics. A suitable cooling rate to achieve a suitable degree of hardening is about 10° C./sec. to about 500° C./sec.

In the inventive vapor manufacturing method, speed of growth of a diffusion layer is different from that in the conventional method of forming copper-zinc alloy by thermal diffusion with zinc and copper being brought into contact with each other. More specifically, the speed of growth of the alloy layer when vapor is utilized is relatively higher than that of thermal diffusion. Further, when processing in zinc vapor, a liquid phase condensed from zinc vapor is partially generated on the copper surface, thereby further increasing the speed of growth. In the inventive vapor method, no oxide film other than a natural oxide film (having a thickness of at most about 0.2 $\mu$m) was observed at the surface of the coating layer.

Preferably, the speed of formation of the thickness of the inventive coating layer is at least 5 $\mu$m/min. When the speed of formation of the coating layer exceeds 5 $\mu$m/min, the surface properties of the wire electrode are better improved, resulting in better electro-discharge machining characteristics. Formation of the coating layer in vapor under pressure higher than atmospheric pressure is preferred, in that better surface properties are achieved and control of composition of Cu alloy in the coating layer is facilitated.

Further, in exposing the core to a vapor having a non-uniform temperature, e.g., a temperature gradient, it is desirable that temperature of the vapor at least near the starting point of exposure of the core or near the end point of exposure is set higher than the lowest temperature of the vapor. When the temperature of the vapor near the start point of exposure to the vapor, or near the end point of exposure, or both near the start point and end point, is set higher than the lowest temperature of the vapor, the speed of formation of the coating layer is increased, so that surface properties of the wire electrode and electro-discharge machining characteristics are improved.

A method of manufacturing a wire electrode for wire electro-discharge machining in accordance with another aspect of the present invention includes the steps of forming a Zn layer on a surface of a core at least a surface layer of which core contains copper, performing diffusion annealing so as to convert the Zn layer into an alloy which serves as a coating layer, and removing an oxide film formed at the surface of the coating layer during diffusion annealing. The Zn layer may be formed by electroplating, hot-dip plating, or cladding by extrusion, for example.

In diffusion annealing embodiments, it is preferable to subject the wire electrode to plastic working after formation of the coating layer, at an area reduction rate of about 40% to about 99%. Further, the copper content of the coating layer should preferably be about 50.5 wt % to about 75 wt %.

A wire electrode for wire electro-discharge machining in accordance with a still further aspect of the present invention includes a core and a coating layer formed on the outer periphery of the core. Material of at least the surface layer of the core contains copper, and material of the coating layer contains an alloy of copper and at least one element selected from the group consisting of Zn, Cs, Se, Te and Mg, with copper content being about 50.5 wt % to about 75 wt %. The coating layer does not have any oxide film, other than a natural oxide film, on its surface.

The inventors have found that when there is not any oxide film other than the natural oxide film on the surface of the wire electrode for wire electro-discharge machining, the accuracy of the cut surface of electro-discharge machining is improved. It is believed that short-circuiting is more likely to occur between the workpiece and the wire electrode because of a concentrated discharge when an oxide film other than a natural oxide film is present, which tendency is more conspicuous at the time of finishing, thereby degrading the accuracy of the process surface.

Further, it has been found that useful lifetime of the wire contact and the guide die are lengthened, since wear and damage are reduced in the absence of an oxide film other than a natural oxide film. It is believed that the existence of an oxide film other than a natural oxide film makes the surface layer very hard and increases friction.

Further, it has been found that the absence of an oxide film other than a natural oxide film facilitates positioning of a wire electrode by causing a weak current to flow therethrough before initiating electro-discharge machining and determining the position of the wire electrode. It is believed that the presence of an oxide film other than a natural oxide film increases surface resistance, thereby rendering it difficult to accurately detect the position of the wire electrode by flowing a current therethrough.

An oxide film generated at a temperature exceeding about 100° C. particularly affects the surface properties of the wire electrode, thereby deteriorating the electro-discharge machining characteristics and shortening the lifetime of the wire contact and the guide die.

Further, it was found that when an oxide film formed on the surface of the coating layer, other than a natural oxide film, particularly an oxide film having a thickness exceeding about 0.2 $\mu$m, the surface properties of the wire electrode is affected, thereby deteriorating the electro-discharge machining characteristics, and shortening the useful lifetime of the wire contact and the guide die.

The wire electrode for electro-discharge machining in accordance with the present invention exhibits superior electro-discharge machining characteristics, enables electro-discharge machining at high speed with high accuracy and less adhesion of electrode material to the workpiece, particularly in applications wherein high and short-time pulse voltages are repeatedly applied.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
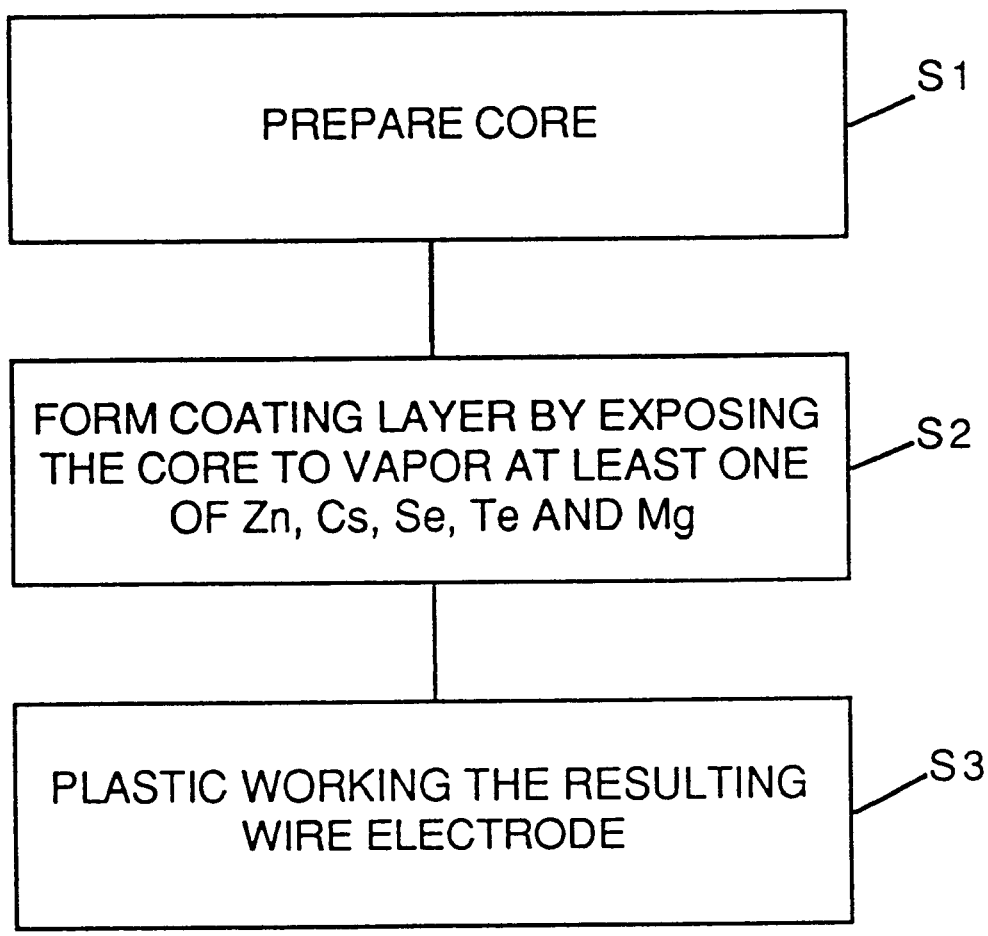
FIG. 1 is a flow chart showing the method of manufacturing a wire electrode for wire electro-discharge machining in accordance with an embodiment of the present invention.

In a method of manufacturing a wire electrode for wire electro-discharge machining in accordance with an embodiment of the present invention is shown in FIG. 1 and comprises initially preparing a core material with at least a surface layer of copper or a copper alloy (step 1). Thereafter, the core is exposed to vapor containing at least one of Zn, Cs, Se, Te and Mg. Consequently, copper contained in the

EXAMPLES

Samples No. 1 to 13 in accordance with the present invention, as shown in Table 1, were fabricated by exposing cores having at least the surface layer formed of copper or copper alloy to vapor of at least one element selected from Zn, Cs, Se, Te and Mg. The thickness of the Cu alloy coating layer generated on the surface of the samples and Cu contents are also shown in Table 1.

TABLE 1

|  | No. | Core | Core Diameter (mm φ) | Vapor Type | Vapor Minimum Temp. (° C.) | Coating Layer Growth Rate (μm/min.) | Pressure During Formation of Coating Layer (mmHg) | Vapor Temp. (° C.) Near Start Point | Vapor Temp. (° C.) Near End Point | Cooling After Passage Through Vapor | Surface Coating Layer Thickness (μm) | Surface Coating Layer Cu Content (wt %) |
|---|---|---|---|---|---|---|---|---|---|---|---|---|
| Examples | 1 | Cu | 0.6 | Mg | 1010 | 29 | Atmospheric Pressure | 1010 | 1025 | Gradual Cooling | 49 | 69 |
|  | 2 | Cu-10% Zn | 1.2 | Zn | 890 | 27 | 780 | 890 | 890 | Rapid Cooling | 92 | 59 |
|  | 3 | Cu-20% Zn | 0.6 | Cs | 620 | 23 | Atmospheric Pressure | 630 | 630 | Rapid Cooling | 30 | 72 |
|  | 4 | Cu Coated Steel Wire | 0.7 | Mg | 1060 | 37 | Atmospheric Pressure | 1070 | 1070 | Rapid Cooling | 58 | 65 |
|  | 5 | Cu-20% Zn | 0.6 | Zn | 850 | 28 | Atmospheric Pressure | 860 | 850 | Rapid Cooling | 51 | 54 |
|  | 6 | Cu-20% Zn | 0.5 | Mg | 950 | 15 | Atmospheric Pressure | 950 | 950 | Rapid Cooling | 42 | 80 |
|  | 7 | Cu-0.6% Sn | 1.9 | Te | 970 | 24 | Atmospheric Pressure | 995 | 975 | Rapid Cooling | 104 | 90 |
|  | 8 | Cu-0.3% Cr-0.1% Zr | 0.23 | Se | 570 | 18 | Atmospheric Pressure | 600 | 600 | Rapid Cooling | 19 | 83 |
|  | 9 | Cu-20% Zn | 0.6 | Zn + Mg | 880 | 38 | Atmospheric Pressure | 890 | 900 | Rapid Cooling | 52 | 51 |
|  | 10 | Cu-20% Zn | 0.6 | Zn + Cs | 670 | 36 | Atmospheric Pressure | 685 | 670 | Rapid Cooling | 45 | 55 |
|  | 11 | Cu-0.15% Ag | 0.4 | Cs | 290 | 4 | 2 | 295 | 290 | Gradual Cooling | 17 | 88 |
|  | 12 | Cu-20% Zn | 0.5 | Zn | 870 | 35 | Atmospheric Pressure | 890 | 885 | Rapid Cooling | 40 | 45 |
|  | 13 | Cu Coated Steel Wire | 0.19 | Zn | 900 | 32 | Atmospheric Pressure | 910 | 900 | Rapid Cooling | 16 | 60 | surface layer of the core reacts with an element contained in the vapor, and a coating layer is formed on an outer periphery of the core (step 2). Thus a wire electrode for wire electro-discharge machining is manufactured.

Thereafter, thus obtained wire electrode for wire electro-discharge machining may be subjected to plastic working, such as drawing or roll working, to attain an area reduction rate of about 40% to about 99% (step 3).

Alternatively, after the core is exposed to the vapor and the coating layer is formed (step 2), the core may be rapidly cooled to form the wire electrode.

Alternatively, before the core is exposed to the vapor, the core may be heated to attain a temperature higher than the vapor temperature, and the core may be exposed in this state to the vapor. Alternatively, after the coating layer is formed in the vapor, the core may be heated to a temperature higher than the vapor temperature.

Preferably, the vapor temperature is set at about 300° C. to about 1050° C., and the speed of formation of the thickness of the coating layer is controlled such that it is at least about 5 μm/min. Further, preferably, the coating layer is formed in vapor under pressure higher than atmospheric pressure.

Samples No. 2, 7 and 11 in accordance with the present invention were exposed to vapor twice, three times and twice, respectively, to attain the surface coating thickness shown in Table 1.

In Table 1, "near the start point" of vapor temperature represents the temperature near a point where exposure of the core to the vapor is started, and "near the end point" represents temperature near a point where exposure of the core to the vapor is terminated. In other words, vapor temperatures near the start point and the end point represent temperatures near the inlet and the outlet of vapor when the core is passed through the vapor.

The following three different samples were also prepared as samples in accordance with the present invention.

Sample No. 14: a sample having Cu coated steel as the core, Cu-45% Zn alloy as the coating layer, wire diameter of 0.7 mm φ and surface thickness of 40 μm was fabricated by hot-dip plating, thermal diffusion and acid pickling.

Sample No. 15: a sample having Cu-20 wt % Zn as the core, Cu-46 wt % Zn alloy as the coating layer, wire diameter of 0.9 mm φ and surface thickness of 60 μm was fabricated by electroplating, thermal diffusion and electrolytic polishing.

Sample No. 16: a sample having Cu-0.3 wt % Sn as the core, Cu-43 wt % Zn alloy as the coating layer, wire diameter of 1.0 mm φ and surface thickness of 70 μm was prepared by electroplating, thermal diffusion and acid pickling.

Further, the following are conventional and comparative examples.

Conventional Sample No. 1: a sample containing Cu-35 .wt 1% Zn, and having wire diameter of 8 mm φ (or wire diameter: 0.9 mm φ).

Comparative Sample No. 1: a sample having Cu-10 w % Zn alloy as the core, Cu-55 w % Zn alloy as the coating layer, wire diameter of 0.6 mm φ, and surface thickness of 80 μm was prepared by electroplating and thermal diffusion.

Comparative Sample No. 2: a sample having steel core, Cu-45 w % Zn alloy as the coating layer, wire diameter of 0.7 mm φ and surface thickness of 40 μm was fabricated by electroplating and thermal diffusion.

Comparative Sample No. 3: a sample having Cu-20 wt % Zn alloy as the core material, Zn as the coating layer, wire diameter of 0.5 mm φ and surface thickness of 38 μm was fabricated by electroplating.

The above described samples were subjected to plastic working, and wire electrodes having desired wire diameters shown in Table 2 below were manufactured. Table 2 shows area reduction rate, surface property and thickness of oxide coating observed at the surface of the coating layer at that time. In order to straighten the wires, soft heat treatment by electric conduction was performed in the final stage of plastic working. Of the wire electrodes thus obtained, those in accordance with the present invention had superior straightness and smooth surfaces without any oxidation/tarnishing.

Samples 8-1, 8-2, 13-1 and 13-2 in accordance with the present invention and Samples No. 1-1 and 1-2 of the Comparative Examples have different wire diameters, respectively.

The wire electrodes shown in Table 2 were mounted on a wire electro-discharge machining apparatus and electro-discharge machining was performed under the same conditions and processing speed. Adhesion of electrode material to the workpiece, cut surface properties of the workpiece, breakage of wire electrodes and easiness of automatic threading were studied. The results are reported in Table 3 below.

As for the processing speed, processed cross sectional area per unit time (product of speed of feeding by thickness of the workpiece) was calculated, and the ratio with respect to the processed cross section of the wire electrode of the conventional example, which was assumed to be 1.0, was calculated and shown as the ratio of processing speed, in Table 3. The adhesion of wire material to the workpiece is also given as a relative ratio, with the adhesion of electrode wire of the conventional example assumed to be 100.

Easiness of positioning the wire electrodes at the start of electro-discharge machining, and lifetime of wire contact and guide die and so on were evaluated, and the results of evaluation are as shown in Table 4.

The lifetime evaluation is given as relative ratio with the lifetime of a conventional Sample No. 1 assumed to be 1.00.

TABLE 2

|  | No. | Wire Diameter (mm φ) | Method of Processing | Area Reduction Rate (%) | Surface Property | Thickness of Oxide Coating (μm) |
|---|---|---|---|---|---|---|
| Examples of the Invention | 1 | 0.2 | Cold Drawing | 89.6 | Oxidation/Tarnishing Not Observed, Smooth | 0.12 |
|  | 2 | 0.3 | Cold Drawing | 94.1 | Oxidation/Tarnishing Not Observed, Smooth | 0.07 |
|  | 3 | 0.2 | Cold Drawing | 89.5 | Oxidation/Tarnishing Not Observed, Smooth | 0.06 |
|  | 4 | 0.2 | Cold Drawing | 92.3 | Oxidation/Tarnishing Not Observed, Smooth | 0.05 |
|  | 5 | 0.2 | Cold Drawing | 89.6 | Oxidation/Tarnishing Not Observed, Smooth | 0.03 |
|  | 6 | 0.2 | Cold Drawing | 84.6 | Oxidation/Tarnishing Not Observed, Smooth | 0.08 |
|  | 7 | 0.2 | Warm Roll Working + Cold Drawing | 98.9 | Oxidation/Tarnishing Not Observed, Smooth | 0.09 |
|  | 8-1 | 0.2 | Cold Drawing | 36 | Oxidation/Tarnishing Not Observed, Smooth | 0.07 |
|  | 8-2 | 0.07 | Cold Drawing | 92.2 | Oxidation/Tarnishing Not Observed, Smooth | 0.05 |
|  | 9 | 0.2 | Cold Drawing | 89.6 | Oxidation/Tarnishing Not Observed, Smooth | 0.04 |
|  | 10 | 0.2 | Cold Drawing | 89.6 | Oxidation/Tarnishing Not Observed, Smooth | 0.06 |
|  | 11 | 0.2 | Cold Drawing | 76.2 | Oxidation/Tarnishing Not Observed, Smooth | 0.08 |
|  | 12 | 0.2 | Cold Drawing | 84.6 | Oxidation/Tarnishing Not Observed, Smooth | 0.05 |
|  | 13-1 | 0.2 | Cold Drawing | 0 | Oxidation/Tarnishing Not Observed, Smooth | 0.06 |
|  | 13-2 | 0.07 | Cold Drawing | 87.8 | Oxidation/Tarnishing Not Observed, Smooth | 0.04 |
|  | 14 | 0.2 | Cold Drawing | 91.8 | Oxidation/Tarnishing Not Observed, Smooth | 0.06 |
|  | 15 | 0.2 | Cold Drawing | 95.1 | Oxidation/Tarnishing Not Observed, Smooth | 0.03 |
|  | 16 | 0.2 | Cold Drawing | 96.0 | Oxidation/Tarnishing Not Observed, Smooth | 0.04 |
| Comparative Examples | 1 | 0.2 | Cold Drawing | 88.9 | Oxidation/Tarnishing Observed, Rough | 0.35 |
|  | 2 | 0.2 | Cold Drawing | 91.8 | Oxidation/Tarnishing Observed, Rough | 0.42 |
|  | 3 | 0.2 | Cold Drawing | 88.9 | Oxidation/Tarnishing Observed, Rough | 0.51 |
| Conventional Examples | 1-1 | 0.2 | Cold Drawing | 99.9 | Oxidation/Tarnishing Not Observed | 0.07 |
|  | 1-2 | 0.07 | Cold Drawing | 99.4 | Oxidation/Tarnishing Not Observed | 0.06 |

TABLE 3

| | No. | Wire Diameter (mm φ) | Ratio of Processing Speed | Workpiece Adhesion | Workpiece Surface Property | Number of Breakage | Easiness of Automatic Threading |
|---|---|---|---|---|---|---|---|
| Examples of the Invention | 1 | 0.2 | 1.34 | 72 | A | 0 | Good |
| | 2 | 0.2 | 1.42 | 61 | A | 0 | Good |
| | 3 | 0.2 | 1.39 | 64 | A | 0 | Good |
| | 4 | 0.2 | 1.38 | 65 | A | 0 | Good |
| | 5 | 0.2 | 1.44 | 60 | A | 0 | Good |
| | 6 | 0.2 | 1.35 | 70 | A | 0 | Good |
| | 7 | 0.2 | 1.36 | 68 | A | 0 | Good |
| | 8-1 | 0.2 | 1.37 | 69 | A | 0 | Good |
| | 8-2 | 0.07 | 1.14 | 68 | A | 2 | Good |
| | 9 | 0.2 | 1.45 | 59 | A | 0 | Good |
| | 10 | 0.2 | 1.43 | 58 | A | 0 | Good |
| | 11 | 0.2 | 1.38 | 64 | A | 0 | Good |
| | 12 | 0.2 | 1.44 | 58 | A | 0 | Good |
| | 13-1 | 0.2 | 1.41 | 60 | A | 0 | Good |
| | 13-2 | 0.07 | 1.22 | 61 | A | 0 | Good |
| | 14 | 0.2 | 1.40 | 62 | A | 0 | Good |
| | 15 | 0.2 | 1.43 | 61 | A | 0 | Good |
| | 16 | 0.2 | 1.41 | 63 | A | 0 | Good |
| Comparative Examples | 1 | 0.2 | 1.30 | 77 | B | 2 | Good |
| | 2 | 0.2 | 1.28 | 82 | B | 1 | Good |
| | 3 | 0.2 | 1.09 | 60 | A | 2 | Good |
| Conventional Examples | 1-1 | 0.2 | 1.00 | 100 | C | 2 | Good |
| | 1-2 | 0.07 | 0.60 | 100 | B | 16 | Good |

Surface property A: excellent (surface was very smooth and free of any dimensional error in thickness direction)
Surface property B: good (surface was smooth and dimensional error in the thickness direction was negligible)
Surface property C: poor (surface was rather rough and there was little dimensional error in thickness direction)

TABLE 4

| | No. | Wire Diameter (mm φ) | Easiness of Positioning | Lives of Wire Contact, Guide Die, Etc. |
|---|---|---|---|---|
| Examples of the Invention | 1 | 0.2 | Easy | 1.04 |
| | 2 | 0.2 | Easy | 1.05 |
| | 3 | 0.2 | Easy | 1.02 |
| | 4 | 0.2 | Easy | 1.07 |
| | 5 | 0.2 | Easy | 1.06 |
| | 6 | 0.2 | Easy | 1.06 |
| | 7 | 0.2 | Easy | 1.04 |
| | 8 | 0.2 | Easy | 1.05 |
| | 9 | 0.2 | Easy | 1.03 |
| | 10 | 0.2 | Easy | 1.04 |
| | 11 | 0.2 | Easy | 1.05 |
| | 12 | 0.2 | Easy | 1.04 |
| | 13 | 0.2 | Easy | 1.07 |
| | 14 | 0.2 | Easy | 1.03 |
| | 15 | 0.2 | Easy | 1.08 |
| | 16 | 0.2 | Easy | 1.04 |
| Comparative Examples | 1 | 0.2 | Difficult | 0.32 |
| | 2 | 0.2 | Difficult | 0.29 |
| | 3 | 0.2 | Difficult | 0.41 |
| Conventional Example | 1 | 0.2 | Easy | 1.00 |

Base upon the results shown in Tables 2, 3 and 4, it is apparent that all the examples of the present invention had higher processing speed, less adhesion of electrode material to the workpiece and a smoother cut surface allowed easy positioning of the wire electrodes at the start of electro-discharge machining and did not affect useful lifetimes of wire contact, guide die and so on, as compared with the comparative examples and conventional examples.

As described above, the wire electrode for wire electro-discharge machining in accordance with the present invention provides a significant improvement in electro-discharge machining characteristics (including processing speed and cut surface property) as compared with the prior art, allows easy positioning of the wire electrode at the start of electro-discharge machining, allows easy automatic threading, and does not affect the lifetime of wire contact, guide die and so on.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing a wire electrode for wire electro-discharge machining, the wire electrode comprising a core, which method comprises:
   exposing the core, at least a surface layer of which contains copper, to a vapor containing at least one element selected from Zn, Cs, Se, Te and Mg,
   thereby reacting the at least one element of the vapor with copper contained in the core surface layer;
   condensing a liquid phase of the element from the vapor on the core surface layer;
   and forming a coating layer on the outer periphery of the core at a rate of at least 5 μm/min.

2. The method as claimed in claim 1, wherein the vapor contains Zn.

3. The method according to claim 1, further comprising:
   after forming the coating layer, plastic working to attain an area reduction rate from 40% to 99%.

4. The method according to claim 1, wherein the coating layer has a copper content in the range of from 50.5 wt % to 75 wt %.

5. The method according to claim 1, wherein the step of exposing the core is performed at a temperature in the range of from 300° C. to 1050° C.

6. The method according to claim 1, further comprising cooling the coating layer at a rate of from 10 to 500° C./Sec.

7. The method according to claim 1, wherein the step of forming is performed at a pressure higher than atmospheric pressure.

8. The method according to claim 1, wherein in said step of exposing said core to said vapor, said vapor has a non-uniform temperature gradient, and at least near a start point of exposure of said core to said vapor or near an end point of exposure of said core to said vapor, the temperatures of said vapor is higher than the lowest temperature of said vapor.

* * * * *